United States Patent [19]
Yamamoto et al.

[11] Patent Number: 5,572,270
[45] Date of Patent: Nov. 5, 1996

[54] OPTICAL APPARATUS HAVING A MOTOR CONTROL DEVICE

[75] Inventors: Harushige Yamamoto, Yamato; Yoshiyuki Kaneko, Kawasaki, both of Japan

[73] Assignee: Canon Kabushiki Kaisha, Tokyo, Japan

[21] Appl. No.: 194,648

[22] Filed: Feb. 10, 1994

Related U.S. Application Data

[63] Continuation of Ser. No. 832,993, Feb. 10, 1992, abandoned.

[30] Foreign Application Priority Data

Feb. 12, 1991 [JP] Japan ...................... 3-019024

[51] Int. Cl.⁶ .................. G03B 1/18; G03B 3/00
[52] U.S. Cl. ................................ 396/133; 396/86
[58] Field of Search ................ 354/195.1, 195.11, 354/195.12, 452, 400

[56] References Cited

U.S. PATENT DOCUMENTS

| | | | |
|---|---|---|---|
| 4,734,726 | 3/1988 | Takahashi et al. | 354/195.1 |
| 4,857,947 | 8/1989 | Wakabayashi et al. | 354/195.1 |
| 4,866,468 | 9/1989 | Himuro et al. | 354/195.1 |
| 4,897,681 | 1/1990 | Yamamoto et al. | 354/271.1 |
| 4,908,647 | 3/1990 | Ueyama | 354/402 |
| 4,922,274 | 5/1990 | Yamamoto et al. | 354/271.1 |
| 5,124,737 | 6/1992 | Inoue et al. | 354/400 |
| 5,150,260 | 9/1992 | Chigira | 357/694 |
| 5,187,513 | 2/1993 | Imanari et al. | 354/195.1 |
| 5,264,888 | 11/1993 | Inoue et al. | 354/400 |
| 5,311,230 | 5/1994 | Ogawa | 354/195.12 |

*Primary Examiner*—Michael L. Gellner
*Assistant Examiner*—Nicholas J. Tuccillo
*Attorney, Agent, or Firm*—Fitzpatrick, Cella, Harper & Scinto

[57] ABSTRACT

An optical apparatus having a movable member movable with a stepping motor as a drive source, and movement controller for moving the movable member to a set position. The movement controller step-drives the stepping motor in one direction by a first frequency so that the movable member may bear against a stopper member, and after the bearing of the movable member against the stopper member is discriminated, step-drives the stepping motor by a predetermined amount in the other direction by a second frequency, which is smaller than the first frequency, and the position of the movable member in that state is defined as the set position.

35 Claims, 3 Drawing Sheets

OPTICAL APPARATUS HAVING A MOTOR CONTROL DEVICE

This application is a continuation of application Ser. No. 07/832,993, filed Feb. 10, 1992, now abandoned.

BACKGROUND OF THE INVENTION

1. Field of the Invention

This invention relates to an optical apparatus having a motor control device for controlling the driving of a stepping motor.

2. Related Background Art

In lens driving using a stepping motor, it is popular to calculate a reference position, i.e., an initial position, by some method or other, and control the motor by using the number of driving steps in conjunction with the reference position.

The accuracy required of lens driving is of the amount of several microns, and in order to detect it, the movement of a lens has been enlarged by the use of a construction which enlarges the movement of the lens, for example, a lever or the like, and the detection of the initial position has been effected by a conventional leaf switch or the like.

In the above-described example of the prior art, the movement of the lens is enlarged by a lever or the like and therefore, good accuracy has not been obtained due to the influence of the back-lash between parts. Since switching timing of the leaf switch, i.e., the relation between the contact pressure and the contact resistance between contacts, is liable to become irregular, it has been difficult to detect the position of the lens with good accuracy. Further, when the position control of the lens is to be accomplished using the position detected by the switch as the initial position, there also arises the problem that a loss of synchronism is liable to be caused. This is because near the aforementioned initial position, a load for driving the switch member is applied to the stepping motor. Accordingly, in the prior-art a lens driving device that is capable of, highly accurate positioning and which determines the driving starting position stably and accurately, has been impossible.

SUMMARY OF THE INVENTION

One aspect of this invention is concerned with a device for moving a movable member with a stepping motor as a drive source, and after it is detected that the movable member has struck against a stopper, the stepping motor is driven in the reverse direction by a frequency lower than the ordinary driving frequency to move the movable member to a predetermined position, whereby the subsequent position control of said movable member can be effected accurately.

One aspect of this invention is concerned with a device for moving a movable member with a stepping motor as a drive source, and after it is detected that the movable member has struck against a stopper, the stepping motor is further driven in the same direction at a frequency lower than the ordinary driving frequency and therefore, said movable member can reliably be caused to bear against said stopper.

DESCRIPTION OF THE PREFERRED EMBODIMENT

Figure 3:
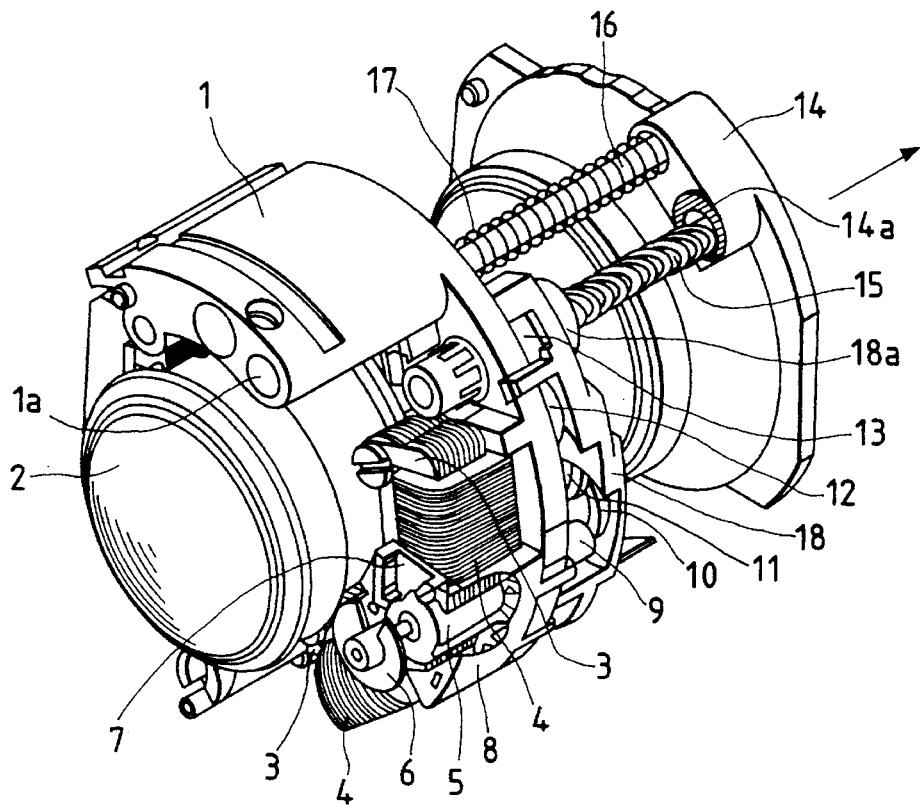
FIG. 3 is a partly exploded perspective view of an optical lens to which the present invention is applied.

An embodiment of the present invention will hereinafter be described with reference to the drawings. FIG. 3 shows an optical lens unit carrying a lens driving device thereon. The reference numeral 1 designates a shutter base plate having a conventional shutter mechanism and having a phototaking lens 2 on the optical axis thereof. The reference numeral 3 denotes fixed yokes each having a coil 4 disposed on a portion thereof, and the reference numeral 5 designates a permanent magnet rotor having a slit plate 6 secured onto the shaft thereof and rotatable with the rotor. The reference numeral 7 denotes a mounting bed for mounting thereon a photointerrupter 104 which will be described later. The mounting bed 7 is formed integrally with a magnet cover 8 having the bearing function of rotatably supporting the rotary shaft of the rotor 5. On the other hand, the shaft at the other end of the rotor 5 is supported by the shutter base plate 1 and has a pinion gear, not shown, secured to the tip end thereof, and drives a female helicoid gear 13 through reduction gears 9, 10, 11 and 12. The female helicoid gear 13 is conventionally helicoid-fitted to a male helicoid 15 extending in the direction of the photo-taking optical axis of a lens holder 14, and the lens holder 14 can be driven back and forth along the optical axis by the rotation of the female helicoid gear 13. Also, the lens holder 14 has a guide bar 16 extending toward a photo-taking lens axis, and is slidably supported in a bearing hole 1a in the shutter base plate 1. Further, a clamper bar, not shown, is disposed at a symmetrical position of approximately 180° with respect to the guide bar 16 (this clamper bar is also disposed parallel to the photo-taking optical axis), and restricts the lens holder 14 against rotation about said guide bar by a cut-away portion (not shown) in the outer periphery of the shutter base plate 1. A compression spring 17 is disposed on the outer peripheral portion of the guide bar 16, thereby putting the back-lash of the reduction gears 9, 10, 11, 12 and the helicoids aside, and biasing the lens holder 14 backward along the optical axis (in the direction of arrow in FIG. 3).

A gear cover 18, which rotatably supports the reduction gears 9, 10, 11, 12 and the female helicoid gear 13 between itself and the shutter base plate 1, has a protruding portion 18a formed so as to surround the male helicoid 15 on the rotary shaft of the female helicoid gear 13, and this protruding portion 18a bears against the dashing portion 14a (the portion hatched in FIG. 3) of the lens holder 14 to thereby effect the dashing operation.

Figure 4:
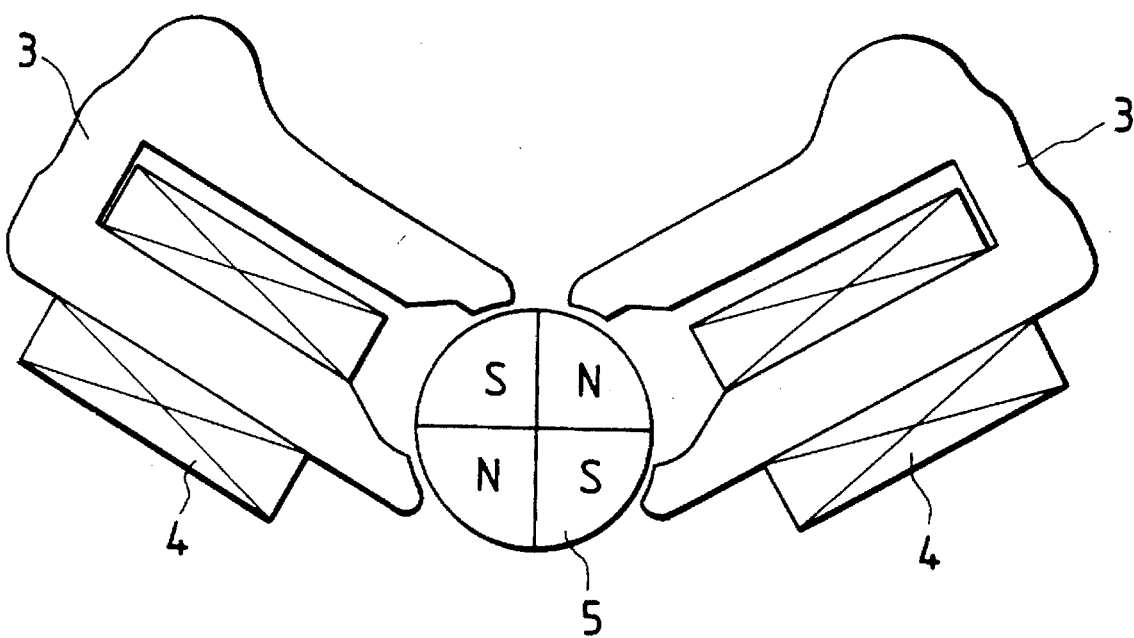
FIG. 4 is a schematic front view of a stepping motor used in the optical lens shown in FIG. 3.

FIG. 4 is a front view showing the essential portions of a conventional stepping motor used in a camera in the present embodiment. The rotor 5 is a permanent magnet having four magnetized poles, and makes one full rotation at eight steps by changing over the electrical energization phase of the pair of coils 4. That is, it is a stepping motor in which the angle of rotation is 45° per step.

Figure 5:
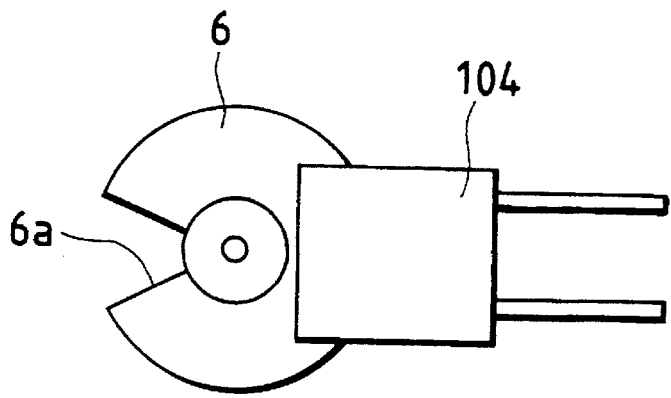
FIG. 5 shows a photointerrupter as motor control means and a slit plate provided in the optical lens shown in FIG. 3.

FIG. 5 is a plan view of essential portions showing the relation between the slit plate 6 and the photointerrupter 104 during the dashing of the lens holder. As shown, the out-away portion 6a of the slit plate 6 is secured to the rotor shaft so as to lie on the substantially opposite side of the photo-interrupter 104 during the dashing state. That is, the design is made such that the photointerrupter detects brightness when return is made by four steps from the dashing. Further, the electrical energization phase during the dashing is written into an EEPROM which will be described later.

Figure 1:
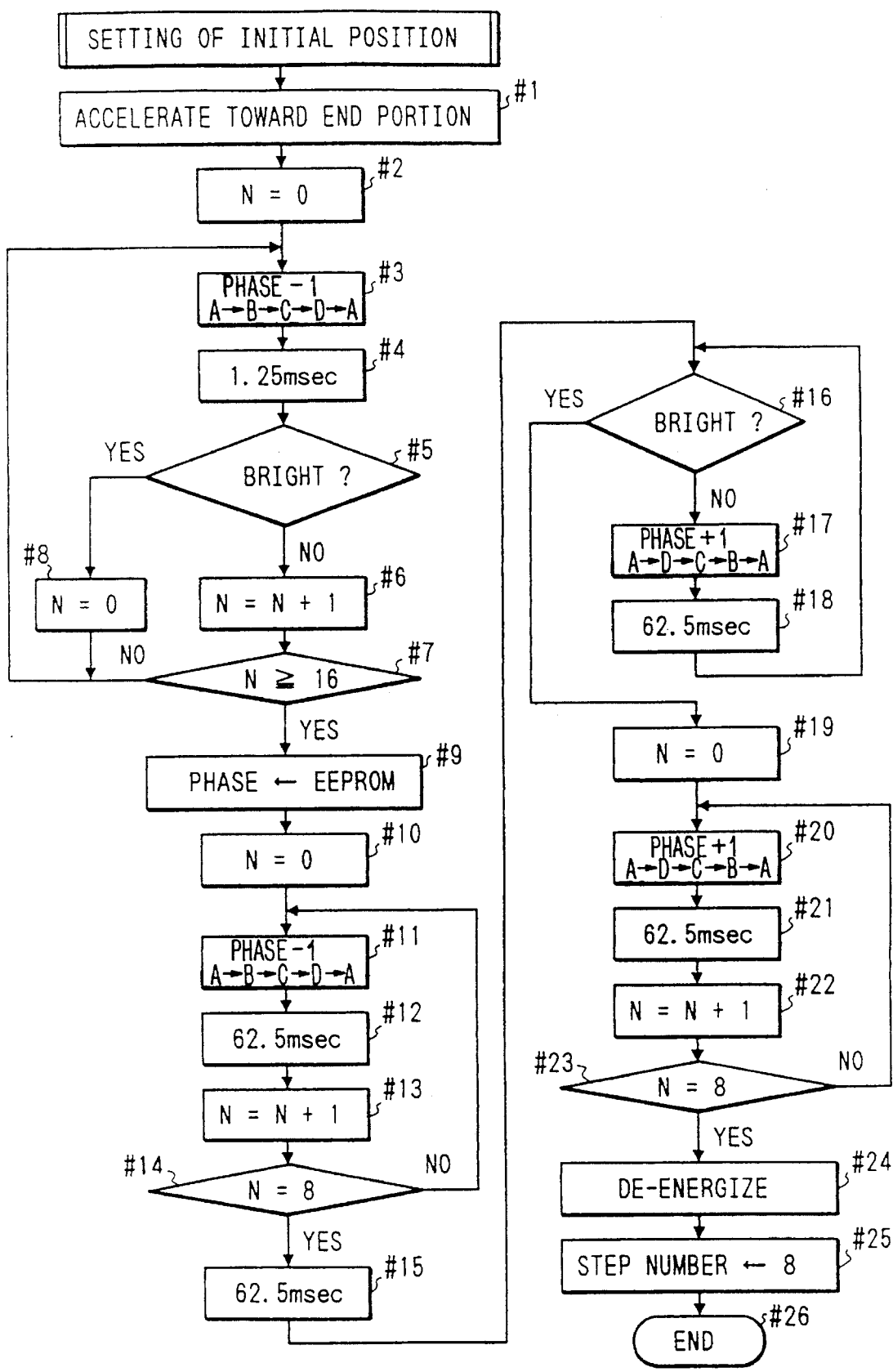
FIG. 1 is a flow chart showing the operation in the method and apparatus of the present invention.
Figure 2:
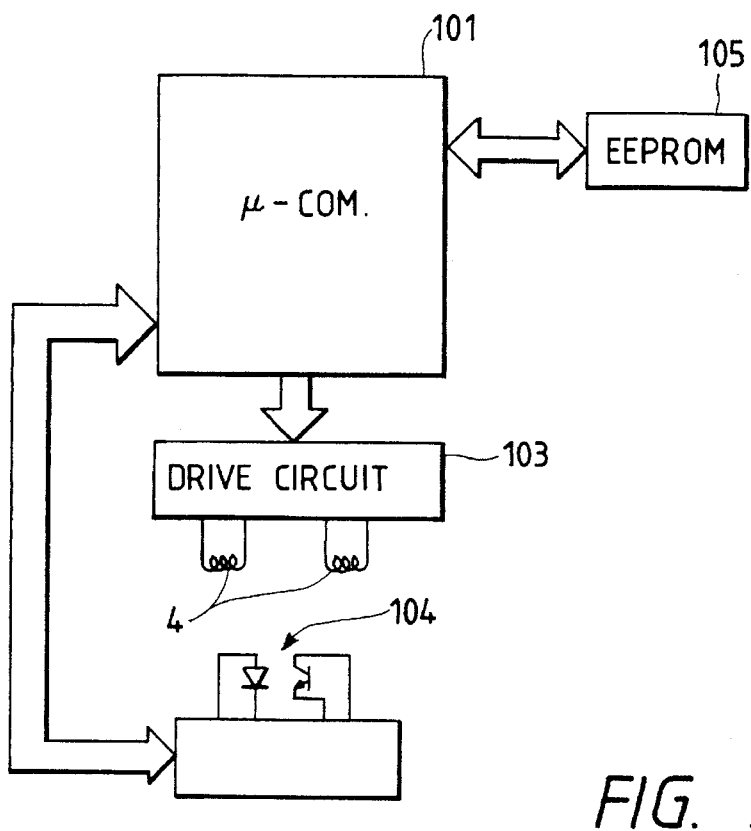
FIG. 2 schematically shows the construction of the essential portions of the apparatus of the present invention.

FIG. 2 is a schematic view showing portions of the apparatus of the present invention, and FIG. 1 is a flow chart showing the initial position setting operation.

In FIG. 2, the reference numeral 101 designates a microcomputer, the reference numeral 4 denotes the coils of the stepping motor, and the reference numeral 103 designates a coil driving circuit which is controlled by the microcomputer 101. The reference numeral 104 denotes a photointerrupter for detecting the rotation of the stepping motor. The reference numeral 105 designates an EEPROM in which a phase for effecting the dashing of the stepping motor is written.

With respect to the lens position, the initial position is the 0 step, and control is effected by counting the number of steps in the plus direction when the lens is driven in the axial outward direction (the forward direction of the optical axis) and with by counting the number of steps in the minus direction when the lens is driven toward the end portion (in the rearward direction of the optical axis). With regard to the electrical energization phase, four possible electrical energization patterns of the pair of coils 4 are defined as A, B, C and D, and it is to be understood that the lens is driven toward the end portion in the order of A→B→C→D→A→. . . Advancing the phase in this direction is expressed as "phase−1" in the description of the embodiment, and as shown in FIG. 1. Conversely, the lens is driven in the axial outward direction in the order of A→D→C→B→A→. . . Advancing the phase in this direction is expressed as "phase+1" in the description of the embodiment, and as shown in FIG. 1.

Whether the stepping motor is moving correspondingly to the driving electrical energization is monitored by a signal being taken out of the slit plate 6 directly mounted on the shaft of the rotor, by the use of the photointerrupter 104. The slit 6a passes once through the photointerrupter per one full rotation of the rotor and therefore, if a signal of a bright level comes at each eight steps, it is judged that the motor is operating normally.

The initial position setting operation, which is an embodiment of the present invention, will now be described with reference to FIG. 1. First, at #1–#7, electrical energization is effected toward the end portion until the bright signal does not come after sixteen steps or more. Specifically, at #1, the stepping motor is accelerated toward the end portion. The acceleration pattern is the conventional trapezoidal wave electrical energization, and the driving period is MAS 800 PPS. At #2, the count value N is made equal to 0. At #3, the phase is advanced toward the end portion. That is, "phase−1" is brought about. At #4, a timer of 1.25 msec. is actuated. Thereby, the electrical energization period becomes 800 PPS which is the inverse number thereof. At #5, the signal of the photointerrupter which detects the rotation of the rotor is checked up. If the signal is of the bright level, at #8, N=0 (count reset)

is set, and if the signal is of the dark level, at #6,

N=N+1 (count up)

is set. When the stepping motor assumes its dashing state, it becomes unmoving at the dark level and therefore, the count of N progresses, and when at #7, N=16 is reached, advance is made to #9.

At #9, the electrical energization phase during the dashing is read out of the EEPROM and set. At #10, N=0 is set, and in the loop of #11–#14, electrical energization is effected toward the end portion by eight steps at a period of 16 PPS which is the inverse number of 62.5 msec. of #12, whereby the protruding portion 18a is reliably stopped while bearing against the dashing portion 14a. In order that the final electrical energization phase may become a phase set by the EEPROM, the electrical energization phase during the dashing is pre-detected and stored in the EEPROM. The period 16 PPS is such a slow period that the vibration of the rotor attenuates sufficiently.

At #15, the stabilization time of the rotor is further waited for at the electrical energization phase set by the EEPROM, whereafter in the loop of #16–#18, electrical energization is effected at the same slow period of 16 PPS as at #11–#14 until a bright signal comes. When the bright signal is detected, the phase thereof is regarded as the 0 step, and in the loop of #20–#23, the lens is axially outwardly moved at a slow period of 16 PPS per eight steps, and is stopped at #24. This position is eight steps and therefore, at #25, step number=8 is set. This completes the initial position setting operation.

In the next driving, these 8 steps are used as the start position, and the lens is driven at an acceleration or deceleration pattern of MAX 800 PPS and trapezoidal wave form.

What is characteristic in the above-described embodiment is that with regard to the setting of the initial position of the lens holder 14, the stepping motor is driven by predetermined steps in the reverse direction by a frequency slower than usual, from a state in which the dashing portion 14a of the lens holder 14 has struck against the protruding portion 18a as a stopper, and that position is defined as the initial position, whereby load fluctuating factors such as the adherence of parts to one another and the flexure of the parts can be eliminated and accurate position setting can be accomplished.

Also, in the above-described embodiment, with regard to the operation of dashing the dashing portion 14a of the lens holder 14 against the protruding portion 18a as a stopper for the setting of the initial position of the lens holder 14, after it is detected that the dashing portion 14a has struck against the protruding portion 18a, the stepping motor is step-driven toward the end by a frequency further slower than usual, whereby the lens holder can be stopped with the dashing portion 14a accurately bearing against the protruding portion 18a. It is thinkable that if the dashing portion 14a is simply caused to bear against the protruding portion 18a by an ordinary fast frequency, the lens holder may be stopped off the bearing position by a bound, etc. and even if the stepping motor is driven thereupon in the phase memorized in the EEPROM, the electrical energization phase and the magnetic poles of the rotor may not coincide with each other to thereby cause loss of synchronism.

What is claimed is:

1. An optical apparatus comprising:

movable member movable in response to a stepping motor, which acts as a drive source;

a stopper member positioned to bear against said movable member at a point of travel of said movable member; and movement control means for moving said movable member to a set position, said movement control means step-driving the stepping motor in one direction at a first frequency so that said movable member bears against said stopper member, and after the bearing of said movable member against said stopper member is discriminated, step-driving the stepping motor by a predetermined amount in a direction opposite to the one direction at a second frequency, which is smaller than said first frequency, the position of said movable member in that state being defined as the set position.

2. An optical apparatus according to claim 1, wherein said movable member is moved to thereby move a lens along the optical axis thereof.

3. An optical apparatus according to claim 1, wherein said movement control means comprises a device which outputs a detection signal each time the stepping motor is driven by a predetermined number of steps, and uses the detection signal when detecting the predetermined number of steps of driving at the second frequency.

4. An optical apparatus according to claim 3, wherein said movement control means determines that said movable member is bearing against said stopper member when the detection signal is not output when the stepping motor is step-driven in the one direction.

5. An optical apparatus according to claim 1, wherein the step driving of the stepping motor in the direction opposite to the one direction by said movement control means is effected by a predetermined electrical energization phase.

6. An optical apparatus according to claim 5, wherein said movement control means is operated by the use of a microcomputer.

7. An optical apparatus comprising:
movable member movable in response to a stepping motor, which acts as a drive source;
a stopper member positioned to bear against said movable member at a point of travel of said movable member; and
movement control means for moving said movable member to a set position, said movement control means step-driving the stepping motor in one direction at a first frequency so that said movable member bears against said stopper member, and after the bearing of said movable member against said stopper member is discriminated, step-driving the stepping motor further in the one direction at a second frequency, which as smaller than said first frequency.

8. An optical apparatus according to claim 7, wherein said movable member is moved to thereby move a lens along the optical axis thereof.

9. An optical apparatus according to claim 7, wherein said movement control means comprises a device which outputs a detection signal each time the stepping motor is driven by a predetermined number of steps, and determines that said movable member is bearing against said stopper member when the detection signal is not output when the stepping motor is step-driven in the one direction.

10. An optical apparatus according to claim 9, wherein the discrimination in said movement control means determines that said movable member is bearing against said stopper member when the detection signal is not output when the stepping motor is step-driven by a predetermined amount in the one direction.

11. An optical apparatus according to claim 7, wherein the step driving at the second frequency by said movement control means is effected by a predetermined electrical energization phase.

12. An optical apparatus according to claim 11, wherein said predetermined electrical energization phase is memorized in memory means.

13. An optical apparatus according to claim 7, wherein said movement control means is operated by the use of a microcomputer.

14. An optical apparatus according to claim 7, wherein the step driving of the stepping motor by said movement control means in the one direction at the second frequency is effected for a predetermined number of steps.

15. An optical apparatus comprising:
movable member movable in response to a stepping motor, which acts as a drive source;
a stopper member positioned to bear against said movable member at a point of travel of said movable member; and
movement control means for moving said movable member to a set position, said movement control means step-driving the stepping motor in one direction at a first frequency so that said movable member bears against said stopper member, and after the bearing of said movable member against said stopper member is discriminated, step-driving said stepping motor further by a predetermined amount in the one direction at a second frequency, which is smaller than said first frequency, and thereafter step-driving the stepping motor by a predetermined amount in a direction opposite to the one direction at a third frequency, which is smaller than said first frequency, the position of said movable member in that state being defined as the set position.

16. An optical apparatus according to claim 15, wherein said movable member is moved to thereby move a lens along the optical axis thereof.

17. An optical apparatus according to claim 15, wherein the second frequency and the third frequency are equal to each other.

18. An optical apparatus according to claim 15, wherein said movement control means comprises a device which outputs a detection signal each time the stepping motor is driven by a predetermined number of steps, and uses the detection signal when detecting the predetermined number of steps of driving at the second frequency.

19. An optical apparatus according to claim 18, wherein said movement control means determines that said movable member is bearing against said stopper member when the detection signal is not output when the stepping motor is step-driven in the one direction.

20. An optical apparatus according to claim 15, wherein the step driving of the stepping motor in the direction opposite the one direction by said movement control means is effected by a predetermined electrical energization phase.

21. An optical apparatus according to claim 15, wherein said movement control means comprises a device which outputs a detection signal each time the stepping motor is driven by a predetermined that said movable member is bearing against said stopper member when the detection signal is not output when the stepping motor is step-driven in the one direction.

22. An optical apparatus according to claim 15, wherein the step driving by the second frequency by said movement control means is effected by a predetermined electrical energization phase.

23. An optical apparatus according to claim 22, wherein said predetermined electrical energization phase is memorized in memory means.

24. An optical apparatus comprising:
a movable member movable in response to a stepping motor, which acts as a drive source;
detecting means for detecting a predetermined position of said movable member; and
movement control means for moving said movable member to a set position, said movement control means stepdriving the stepping motor at a first frequency causing said movable member to move in one direction, wherein after the detecting means determines that said movable member is bearing against the predetermined position, said control means step-drives the stepping motor at a second designated frequency, which is smaller than said first designated frequency, and causes said movable member to move by a predetermined amount in a direction opposite to the one direction to the set position.

25. An optical apparatus according to claim 24, wherein said movable member is moved to thereby move a lens along the optical axis thereof.

26. An optical apparatus according to claim 24, wherein said movement control means comprises a device which outputs a detection signal each time the stepping motor is driven by a predetermined number of steps, and uses the detection signal when detecting the predetermined number of steps of driving at the second frequency.

27. An optical apparatus according to claim 26, wherein said detecting means determines that said movable member is at the predetermined position when the detection signal is not output when the stepping motor is step-driven in the one direction.

28. An optical apparatus according to claim 24, wherein the step driving of the stepping motor in the direction opposite to the one direction by said movement control means is effected by a predetermined electrical energization means.

29. An optical apparatus according to claim 28, wherein the predetermined electrical energization phase is memorized in memory means.

30. An optical apparatus according to claim 28, wherein the step-driving of the stepping motor by said movement control means in the one direction at the second frequency is effected for a predetermined number of steps.

31. An optical apparatus comprising:

a movable member movable in response to a motor which acts as a drive source;

a stopper member positioned to bear against said movable member at a point of travel of said movable member; and movement control means for moving said movable member to a set position, said movement control means driving the motor in one direction so that said movable member bears against said stopper member, and after the bearing of said movable member against said stopper member is discriminated, driving the motor by a predetermined amount in a direction opposite to the one direction, the position of said movable member in that state being defined as the set position;

wherein the set position of said movable member is located at a predetermined distance spaced away from said stopper member.

32. An optical apparatus according to claim 31, wherein said movable member is moved to thereby move a lens along the optical axis thereof.

33. An optical apparatus according to claim 31, wherein the motor is a stepping motor.

34. An optical apparatus comprising:

a movable member movable in response to a stepping motor, which acts as a drive source:

a stopper member positioned to bear against said movable member at a point of travel of said movable member; and movement control means for moving said movable member to a set position, said movement control means driving the motor in one direction so that said movable member bears against said stopper member, and after the bearing of said movable member against said stopper member is discriminated, driving the motor by a predetermined amount in a direction opposite to the one direction, the position of said movable member in that state being defined as the set position, wherein said movement control means comprises a device which outputs a detection signal each time the motor is driven by a predetermined amount, and uses the detection signal when detecting the predetermined amount.

35. An optical apparatus according to claim 34, wherein said movement control means determines that said movable member is bearing against said stopper member when the detection signal is not output when the motor is driven in the one direction.

* * * * *

UNITED STATES PATENT AND TRADEMARK OFFICE
CERTIFICATE OF CORRECTION

PATENT NO. : 5,572,270  
DATED : November 5, 1996  
INVENTOR(S) : HARUSHIGE YAMAMOTO, ET AL.

Page 1 of 2

It is certified that error appears in the above-indentified patent and that said Letters Patent is hereby corrected as shown below:

COLUMN 1

Line 28, "Since" should read --Since the--.
Line 39, "of," should read --of--.

COLUMN 3

Line 23, "with" should be deleted.

COLUMN 5

Line 40, "as" should read --is--.

COLUMN 6

Line 49, "predetermined" should read --predetermined number of steps, and determines--.

UNITED STATES PATENT AND TRADEMARK OFFICE
CERTIFICATE OF CORRECTION

PATENT NO. : 5,572,270

DATED : November 5, 1996

INVENTOR(S) : HARUSHIGE YAMAMOTO, ET AL.

It is certified that error appears in the above-indentified patent and that said Letters Patent is hereby corrected as shown below:

COLUMN 7

Line 1, "stepdriving" should read --step-driving--.

COLUMN 8

Line 8, "position;" should read --position,--.

Signed and Sealed this

Fifteenth Day of April, 1997

Attest:

BRUCE LEHMAN

Attesting Officer

Commissioner of Patents and Trademarks